(12) United States Patent
Saggar et al.

(10) Patent No.: US 12,108,401 B2
(45) Date of Patent: Oct. 1, 2024

(54) NON-COHERENT PHYSICAL UPLINK CONTROL CHANNEL (PUCCH) FORMAT FOR A TIME-DOMAIN SINGLE-CARRIER WAVEFORM

(71) Applicant: QUALCOMM Incorporated, San Diego, CA (US)

(72) Inventors: Hemant Saggar, Irvine, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 419 days.

(21) Appl. No.: 17/404,473

(22) Filed: Aug. 17, 2021

(65) Prior Publication Data

US 2023/0054155 A1   Feb. 23, 2023

(51) Int. Cl.
 *H04W 72/21* (2023.01)
 *G06F 16/2458* (2019.01)
 *H04J 13/00* (2011.01)
 *H04L 27/26* (2006.01)
 *H04W 72/044* (2023.01)

(52) U.S. Cl.
 CPC ........ *H04W 72/21* (2023.01); *G06F 16/2474* (2019.01); *H04J 13/0077* (2013.01); *H04L 27/2605* (2013.01); *H04W 72/044* (2013.01)

(58) Field of Classification Search
 CPC . H04W 72/21; H04W 72/044; G05F 16/2474; H04J 13/0077; H04L 27/2605
 See application file for complete search history.

(56) References Cited

U.S. PATENT DOCUMENTS

| | | | | |
|---|---|---|---|---|
| 2023/0209555 | A1* | 6/2023 | Sosnin | H04L 5/0053 370/329 |
| 2023/0328736 | A1* | 10/2023 | Choi | H04W 72/12 370/330 |

* cited by examiner

*Primary Examiner* — Basil Ma
(74) *Attorney, Agent, or Firm* — Patterson + Sheridan. LLP

(57) ABSTRACT

Aspects of the present disclosure relate to wireless communications, and more particularly, to techniques for control signal transmission. One aspect provides a method for wireless communication by a user equipment (UE). The method generally includes receiving, from a base station (BS), a message indicating multiple configurations for physical uplink control channel (PUCCH) transmission; selecting, from a sequence database, a sequence to be used for the transmission of a PUCCH in accordance with one of the multiple configurations indicated by the message from the base station; and transmitting the PUCCH using the selected sequence.

29 Claims, 11 Drawing Sheets

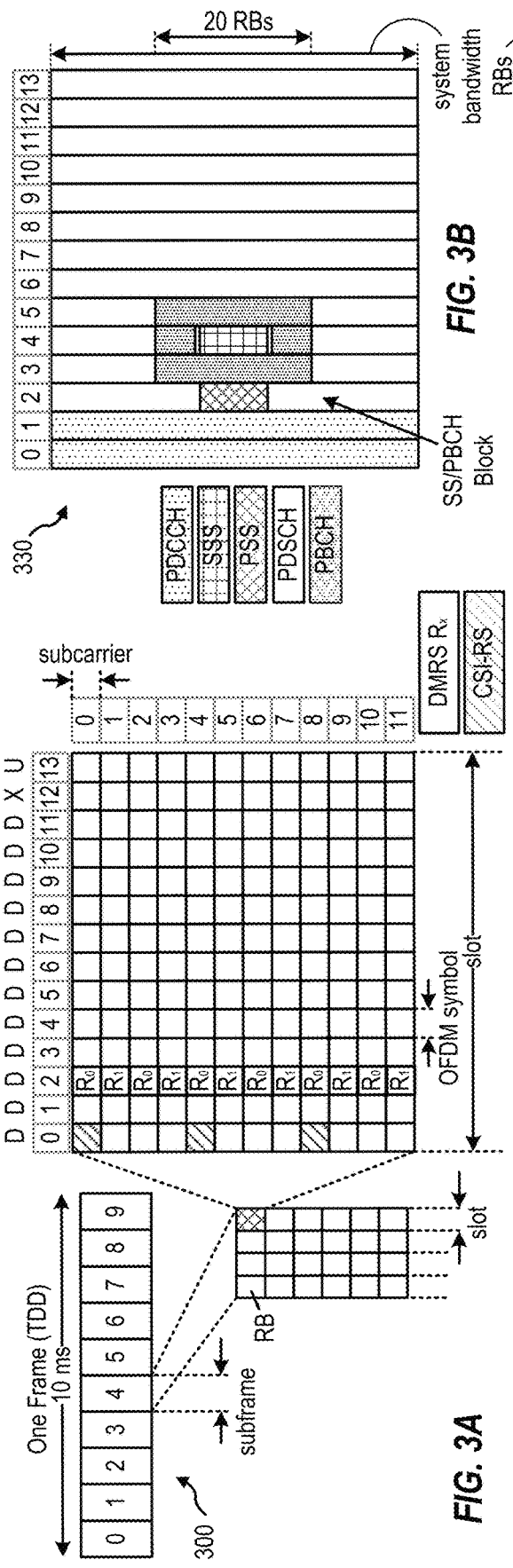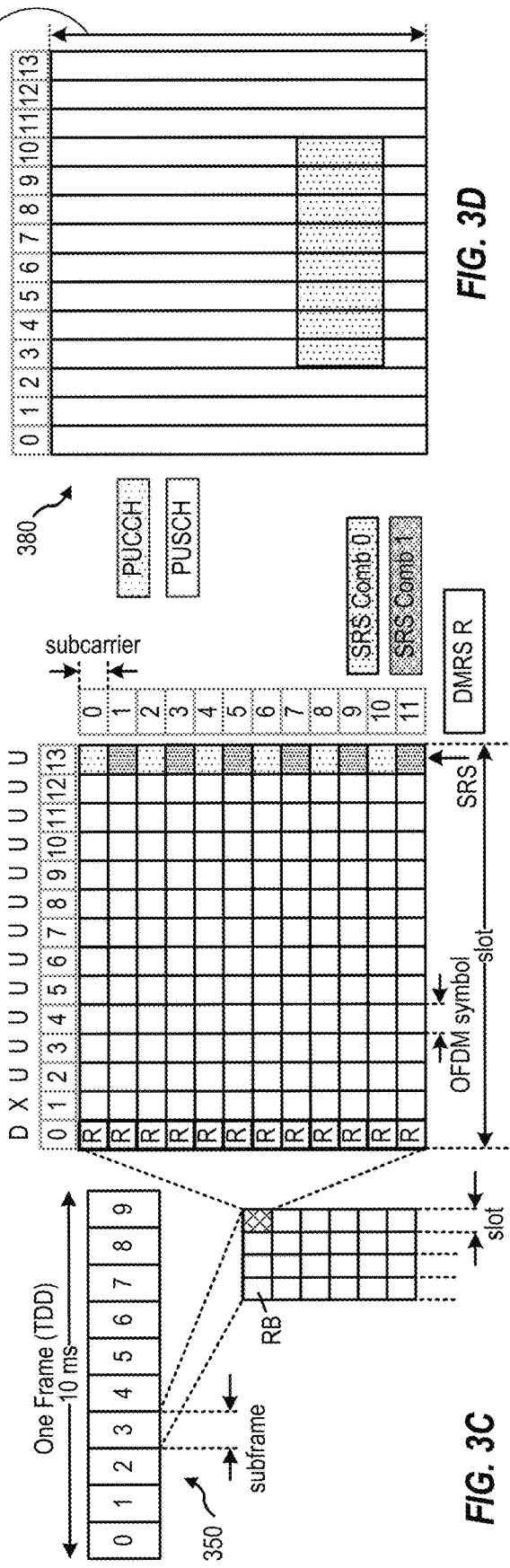

NON-COHERENT PHYSICAL UPLINK CONTROL CHANNEL (PUCCH) FORMAT FOR A TIME-DOMAIN SINGLE-CARRIER WAVEFORM

INTRODUCTION

Aspects of the present disclosure relate to wireless communications, and more particularly, to techniques for control signal transmission.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code-division, time division, frequency division orthogonal frequency division, single-carrier frequency division, or time division synchronous code-division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a user equipment (UE). The method generally includes receiving, from a base station (BS), a message indicating multiple configurations for physical uplink control channel (PUCCH) transmission; selecting, from a sequence database, a sequence to be used for the transmission of a PUCCH in accordance with one of the multiple configurations indicated by the message from the base station; and transmitting the PUCCH using the selected sequence.

Another aspect provides a method for wireless communication by a BS. The method generally includes transmitting, to a UE, a message indicating multiple configurations for PUCCH transmission; and receiving, from the UE, a PUCCH having a sequence selected in accordance with one of the configurations indicated by the message to the UE.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for control signal transmission. With next-generation radio access technologies using higher frequencies and subcarrier spacing (SCS), phase noise experienced during communication and the computation load (and complexity due to the associated increase in the number of fast Fourier transform (FFT) operations per unit time) of a user equipment (UE) are increasing. Moreover, using orthogonal frequency-division multiplexing (OFDM) results in increased peak to average power ratio (PAPR), which places a constraint on transmit power at the UE. Therefore, what is needed are techniques for PUCCH transmission with a lower UE computation complexity, lower impact on phase noise, and lower PAPR.

Certain aspects of the present disclosure are directed to techniques for implementing PUCCH transmission using a non-discrete Fourier transform (DFT) based single carrier waveform. For example, a non-coherent time-based PUCCH format may be used for transmission using the single-carrier waveform. Using a non-coherent single carrier transmission technique reduces UE computation complexity, PAPR, and phase noise (e.g., due to only using a single carrier). In some aspects, a sequence may be selected to transmit information using the PUCCH. The PUCCH may be generated by multiplying the sequence with a cover code that facilitate code-division multiplexing of UEs such that the UEs can transmit using the same time and frequency resources.

Introduction to Wireless Communication Networks

Figure 1:
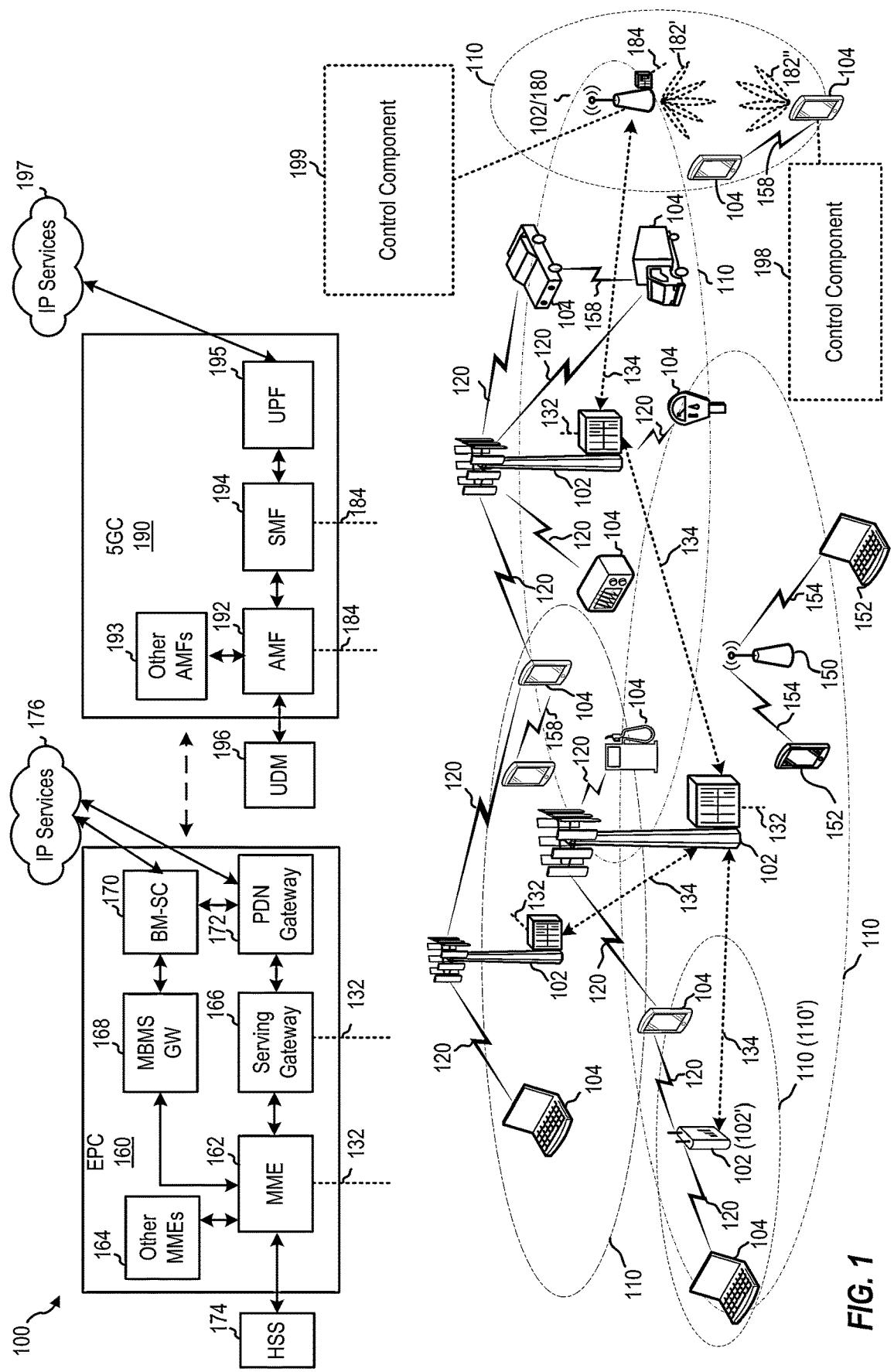
FIG. 1 is a block diagram conceptually illustrating an example wireless communication network.

FIG. 1 depicts an example of a wireless communications system 100, in which aspects described herein may be implemented.

Generally, wireless communications system 100 includes base stations (B Ss) 102, user equipments (UEs) 104, one or more core networks, such as an Evolved Packet Core (EPC) 160 and 5-G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes a control component 199, which may be configured to receive on control channel using code-division multiplexing. Wireless network 100 further includes a control component 198, which may be used configured to select a sequence for transmission on a control channel using a code-division multiplexing.

Figure 2:
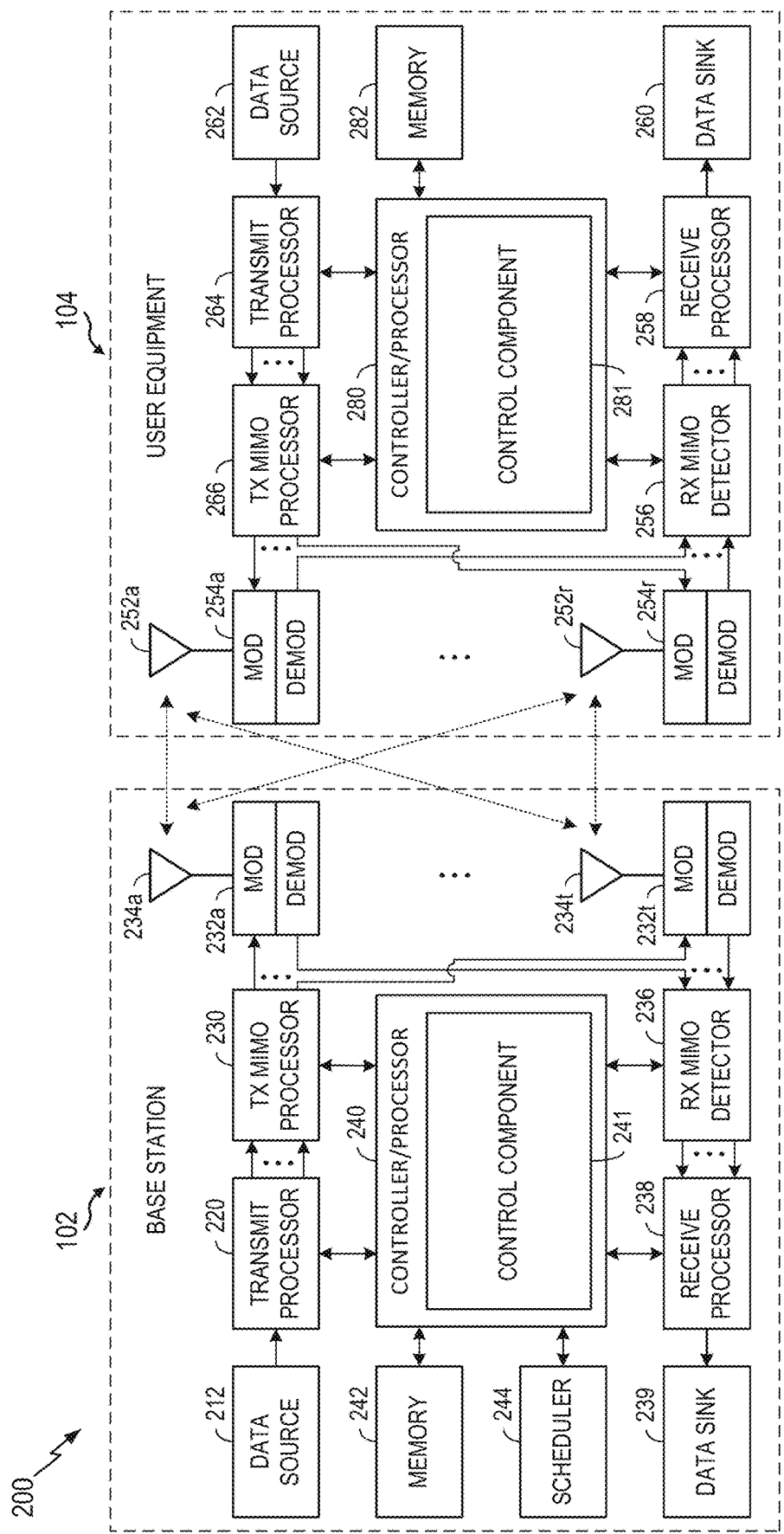
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes a control component 241, which may be representative of a control component 199 of FIG. 1. Notably, while depicted as an aspect of controller/processor 240, a control component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 102 includes controller/processor 280, which may be configured to implement various functions related to wireless communications. In the depicted example, controller/processor 280 includes a control component 281, which may be representative of a control component 198 of FIG. 1. Notably, while depicted as an aspect of controller/processor 280, a control component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Aspects Related to Control Signal Transmission

As the need for data rates and network density increases, it is expected that new radio (NR) will scale to mmWave carrier frequencies higher than 71 GHz. To enable multi-GHz bandwidth while keeping fast-Fourier transform (FFT) size in check (e.g., to limit computation complexity at the UE), sub-carrier spacing may scale to about 1 MHz or beyond, increasing the computational load on the UE. The impact of phase noise will be higher at higher subcarrier spacing (SCS) and may involve the configuration of more resources and improved algorithms for the mitigation of phase noise. OFDM already has a high peak to average power ratio (PAPR), which limits the coverage (e.g., transmit power constraint) of a UE. For these reasons, alternative waveform designs with improved efficiency are becoming important. In some aspects, a quadrature amplitude modulation (QAM) single-carrier waveform may be used for transmission of a physical uplink control channel (PUCCH). In some aspects, a phase shift keying (PSK) single carrier waveform may be used.

Although discrete Fourier transform (DFT) spread OFDM (DFT-s-OFDM waveform) is also a single carrier waveform used in NR, going for a non-DFT based QAM or PSK single-carrier waveform gives more advantages at higher frequencies, such as lower PAPR, lower computational complexity due to removal of FFT operations at the transmitter, and lower impact of phase noise. Using single carrier waveforms (e.g., a QAM single carrier waveform) also allows the use of cyclic-prefix/guard-interval and frequency domain equalization.

Some aspects provide techniques for using single carrier (e.g., QAM) with a time-domain waveform instead of the time/frequency grid available in OFDM. Restricting to the time domain involves modifications to a complicated set of PUCCH formats in NR that are time/frequency grid-based. For example, in NR, while format-0 and format-1 both use 1 resource block (RB) in the frequency domain, format-0 uses up to 2 symbols in the time domain and format-1 uses up to 14 symbols in the time domain. This difference allows for different coverage/repetition specifications of different UEs. Certain aspects achieve the repetition capability with a simple but extensible PUCCH format design in a time-based single carrier waveform.

Similarly in NR, both format-3 and format-4 PUCCH are used to send a large amount of uplink control information, including, for example, a channel state information (CSI)-report to the base station, and can be up to 14 symbols. However, format-4 uses 1 RB, whereas format-3 uses up to 16 RBs to enable code-division multiplexing of more UEs on each physical resource block (PRB). Again, such a design may not be used in a single carrier implementation as single carrier transmissions are expected to be wideband by design and the capability to time-division and/or code-division multiplex many users can be flexibly built into a time-domain PUCCH format.

PUCCH may be implemented using a non-coherent design (e.g., being sequence-based and having no DMRS) for short transmissions, or using a coherent design (e.g., using a sequence or data-based with DMRS) for longer transmissions. Format-0 PUCCH is non-coherent, while format-1 through 4 are coherent formats. In some cases, frequency hopping between symbols (e.g., to achieve diversity) may be implemented, along with base-sequence and cyclic-shift hopping to randomize cross-cell interference. Some aspects code-division-multiplex (CDM) users by using orthogonal cover codes.

Certain aspects provide a design of a non-coherent time-based PUCCH format for the single-carrier waveform. The design allows high efficiency sequence-based transmissions, but is also flexible enough that the design can be extended to longer lengths through repetition or usage of a longer sequence. Certain aspects provide the capability to CDM users to allow more users to share the PUCCH resource, with both orthogonal and non-orthogonal codes. Two types of CDMing are provided herein, each type allowing for transmission using different CDM levels. A CDM level generally refers to the number of UEs that are CDMed (e.g., N UEs simultaneously use the same time-frequency resource). The two types CDMing for non-coherent PUCCH include type A CDMing using a length L sequence that is repeated N times and then modulated onto a cover code of length N, and a type B CDMing using a proportionately longer length NL sequence which is shared by all users albeit with different parameters, that is chosen from a sequence database for transmission, N and L being positive integers.

Figure 4:
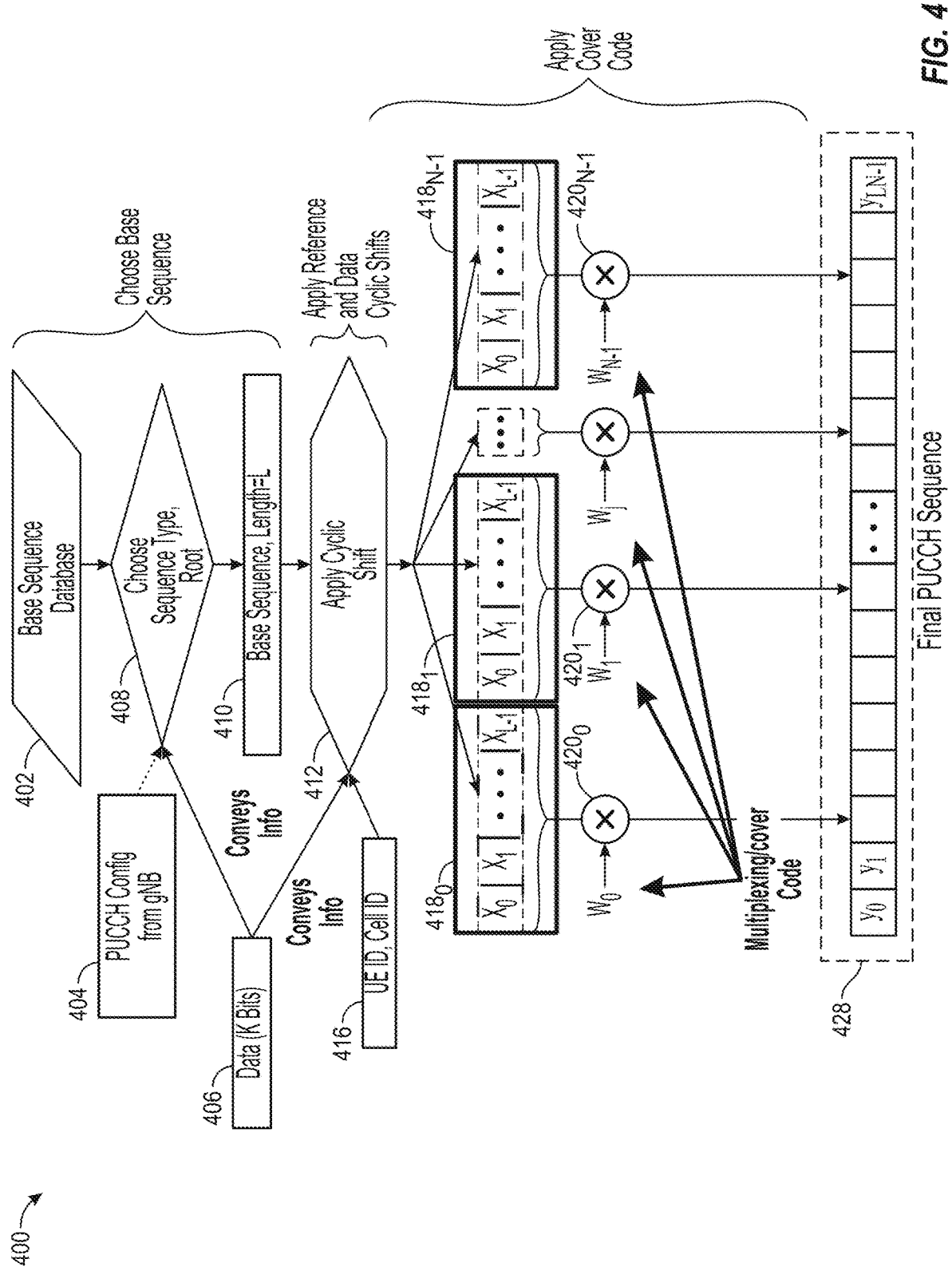
FIG. 4 is a block diagram illustrating example operations for physical uplink control channel design using a short sequence, in accordance with certain aspects of the present disclosure.

FIG. 4 is a block diagram illustrating example operations 400 for implementing a PUCCH design, in accordance with certain aspects of the present disclosure. Operations 400 show techniques for sequence generation using CDMing, also referred to as type A CDMing. For type A CDMing, a chosen sequence of length L is repeated N times, and a cover code is applied on these repetitions so that different users (e.g., UEs) using (e.g., almost or completely) orthogonal cover codes can transmit PUCCH orthogonally to the BS. Type A CDMing involves storing fewer sequences at the UE (e.g., of length L and using N repetitions) as compared to type B CDMing, but the performance of type A CDMing depends on how well the cover coded base sequence handles inter-UE interference caused by multipath signals (e.g., causing residual interference).

As shown, a UE may maintain a sequence database 402 (e.g., a base sequence database). Various sequences may be stored in the sequence database 402, from which a UE may select a sequence to be used for PUCCH. The sequence database 402 may include sequences of different lengths, roots, and/or types (e.g., Zadoff-Chu (ZC) sequence or Gold sequence). Each sequence may be associated with a time and frequency resource to be used for transmission. A UE may transmit, on a PUCCH, a sequence that is derived from the sequence database. For example, at block 408, the UE may select the sequence based on a set of network configurable parameters (e.g., level of code-division multiplexing, length of sequence, type of code-division multiplexing, etc.). As an example, at block 408, the UE may receive PUCCH configurations 404 from a base station (BS), based on which the sequence may be selected at block 408, as described. For example, multiple candidate configurations (e.g., lengths of sequences) may be indicated to the UE, allowing the UE to select a sequence based on one of the configurations depending on the communication scenario (e.g., amount of data to be transmitted) of the UE.

In some aspects, the UE may select the sequence based on data 406 (e.g., control information having K bits) to be transmitted. For example, the UE may select a sequence having a longer length L (e.g., as shown in block 410) if the UE is to transmit a greater amount of information, and select a sequence having a shorter length L if the UE is to transmit less information. At block 412, the UE may apply cyclic shifts for reference signals and data to be transmitted using the sequence.

After applying the cyclic shifts, the generated sequence having L elements may be repeated N times as shown. In other words, the UE may generate the repetitions 418o to 418N-1. Each repetition may be multiplied (e.g., via a respective one of the multipliers 420o to 420N-1, collectively referred to as multipliers 420) by a cover code wo to WN-1 to facilitate orthogonality of transmission from different UEs. The outputs of the multipliers 420 are concatenated to generate the final PUCCH sequence 428 having elements yo to ym-1. The final PUCCH sequence 428 may be transmitted using a single carrier, as described herein. Using the single carrier to transmit the PUCCH sequence 428 facilitates reduction in computation complexity, phase noise, and PAPR, as described herein.

In some aspects, each sequence may be a Zadoff-Chu (ZC) sequence and the sequence database may include ZC sequences of variable lengths and roots. As described, the length of the ZC sequence to be selected from the database may be chosen based on the number of bits to be communicated (e.g., more bits use a longer sequence).

In some aspects, information may be communicated using a root of the selected ZC sequence. In other words, different roots may be mapped to different information such that the selection of the root indicates the associated information to a receiving UE.

The PUCCH may be processed based on a selected level of CDMing. For example, the chosen ZC sequence may be repeated N times along with a cover code, where each UE uses a different cover code. This enables CDMing of UEs, and the number of repetitions N may be selected flexibly on top of the sequence.

Another example of a sequence is a sampled DFT sequence. For example, the sequence database may include DFT sequences of length K, where K is variable and possibly sampled from a larger DFT matrix with at least K columns. Depending on the number of bits to be transmitted, an appropriate length DFT sequence is chosen. User CDM is achieved by using different DFT sequences at different users. Other suitable sequences may also be used such as Gold sequences or Hadamard sequences, to name a few.

Figure 5:
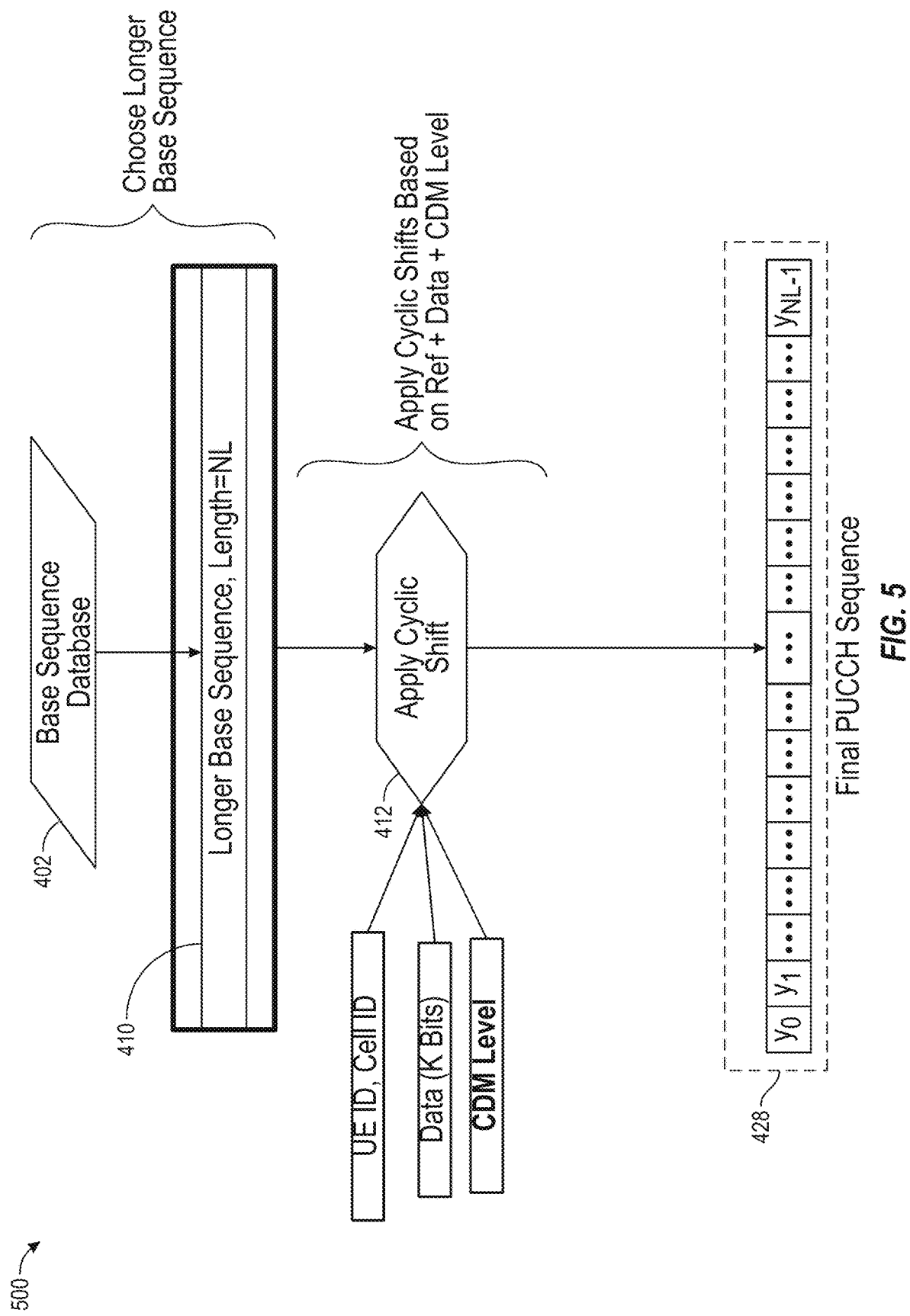
FIG. 5 is a block diagram illustrating example operations for physical uplink control channel design using a long sequence, in accordance with certain aspects of the present disclosure.

FIG. 5 is a block diagram illustrating example operations 500 for implementing a PUCCH design, in accordance with certain aspects of the present disclosure. Operations 500 show techniques for sequence generation using CDMing, also referred to as type B CDMing. In type B CDMing, a longer sequence (e.g., of length NL) may be chosen from the sequence database 402 such that users can be separated via cyclic shifts or roots. For example, only 1/Nth of the cyclic-shift or roots may be used to indicate information by a UE at block 412. The rest of the cyclic-shift or roots are reserved for other UEs, respectively. Since the length of the sequence is N times that of a sequence for type A CDMing, the number of cyclic shift or roots available per user for indicating information is still the same. PUCCH is easier to construct using type B CDMing and may have better performance than type A because of stronger autocorrelation properties of the base sequence, but involves each UE storing longer length sequences at the UE (e.g., length NL).

In some aspects, the cover codes used by the UE may be orthogonal or non-orthogonal (e.g., close to orthogonal) and may be specified by the network. Orthogonal codes allow interference-free (or at least reduced) CDMing. Examples of orthogonal codes include a DFT code, a Zadoff-Chu sequence, and a Hadamard sequence. Non-orthogonal codes allow many more UEs to be multiplexed as compared to using orthogonal codes. Examples of non-orthogonal codes include quadrature phase-shift keying (QPSK)/quadrature amplitude modulation (QAM) sequence, or a sampled discrete Fourier Transform (DFT) code.

In some aspects, the indication of information is through cyclic shifts. For example, in type A CDMing as described with respect to FIG. 4, information is indicated by cyclic shifts/roots of the length L sequence. In type B CDMing, information is indicated by cyclic shifts/roots of the length NL sequence.

In some aspects, the network (e.g., BS) multiplexes (e.g., time divisional multiplex (TDM)) the PUCCH from different UEs in separate time locations. The BS may also CDM the PUCCH from different UEs during the same time-frequency resource. Along with the PUCCH resource allocation, the network indicates what level of CDMing the UE will use. Additionally, the network may indicate the type of CDMing to use (e.g., type A or type B, as described). A separate PUCCH resource configuration on downlink signaling (e.g., downlink control information (DCI)/medium access control (MAC)-control element (CE), or radio resource control (RRC) signaling) may be provided to allocate PUCCH resources for the UE.

In some aspects, the base sequence and its reference cyclic shift to be used by the UE may depend on a network allocated UE ID and cell ID. This is used to randomize the transmitted sequence (e.g., for different cells) and mitigate cross-cell interference. The base-sequence and reference cyclic shifts may change periodically (e.g., for each slot) or dynamically (e.g., as configured by the network). This randomizes and mitigates cross-cell interference.

In some aspects, the network configures a fixed number of cyclic shifts/roots for a UE to use to indicate information (e.g., data) using PUCCH. For example, the UE may map uplink control information (e.g., including acknowledgment (ACK)/negative ACK (NACK), Scheduling Request, channel state information (CSI)-report) to an appropriate shift of the PUCCH sequence. The network may also allow the UE to convey information using the parameters of the sequence used, such as choosing the root of a Zadoff-Chu sequence, or the modulation level of a QAM sequence.

Figure 6:
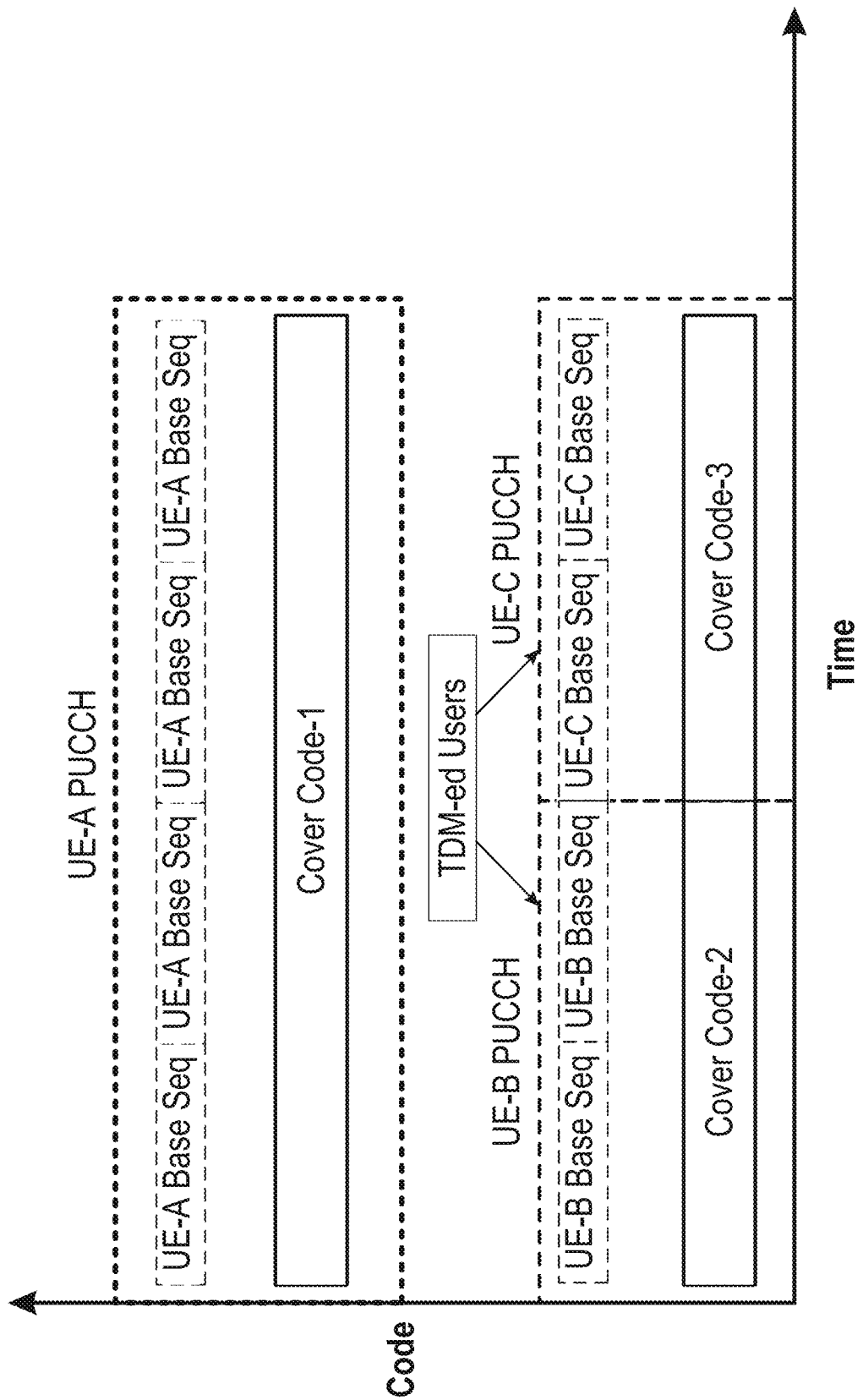
FIG. 6 illustrates code-division multiplexing of small physical uplink control channel sequences with a long physical uplink control channel sequence, in accordance with certain aspects of the present disclosure.

FIG. 6 illustrates CDMing of smaller PUCCH sequences with a longer PUCCH sequence, in accordance with certain aspects of the present disclosure. As shown, the cover code of PUCCH allows users with smaller PUCCH sequences to be TDMed within a longer PUCCH sequence by using the appropriate cover code. For example, as shown, UE-A may transmit a long base sequence generated by multiplication with cover code-1. UE-B may transmit a shorter base sequence that is TDMed with a shorter base sequence transmitted by UE-C. Cover code-1 used by UE-A may be implemented such that the PUCCH from UE-A is orthogonal with the transmissions of PUCCH by UE-B and UE-C. For example, the first half of cover code-1 may be orthogonal with cover code-2 and the second half of the cover code-1 may be orthogonal with cover code-3.

Figure 7:
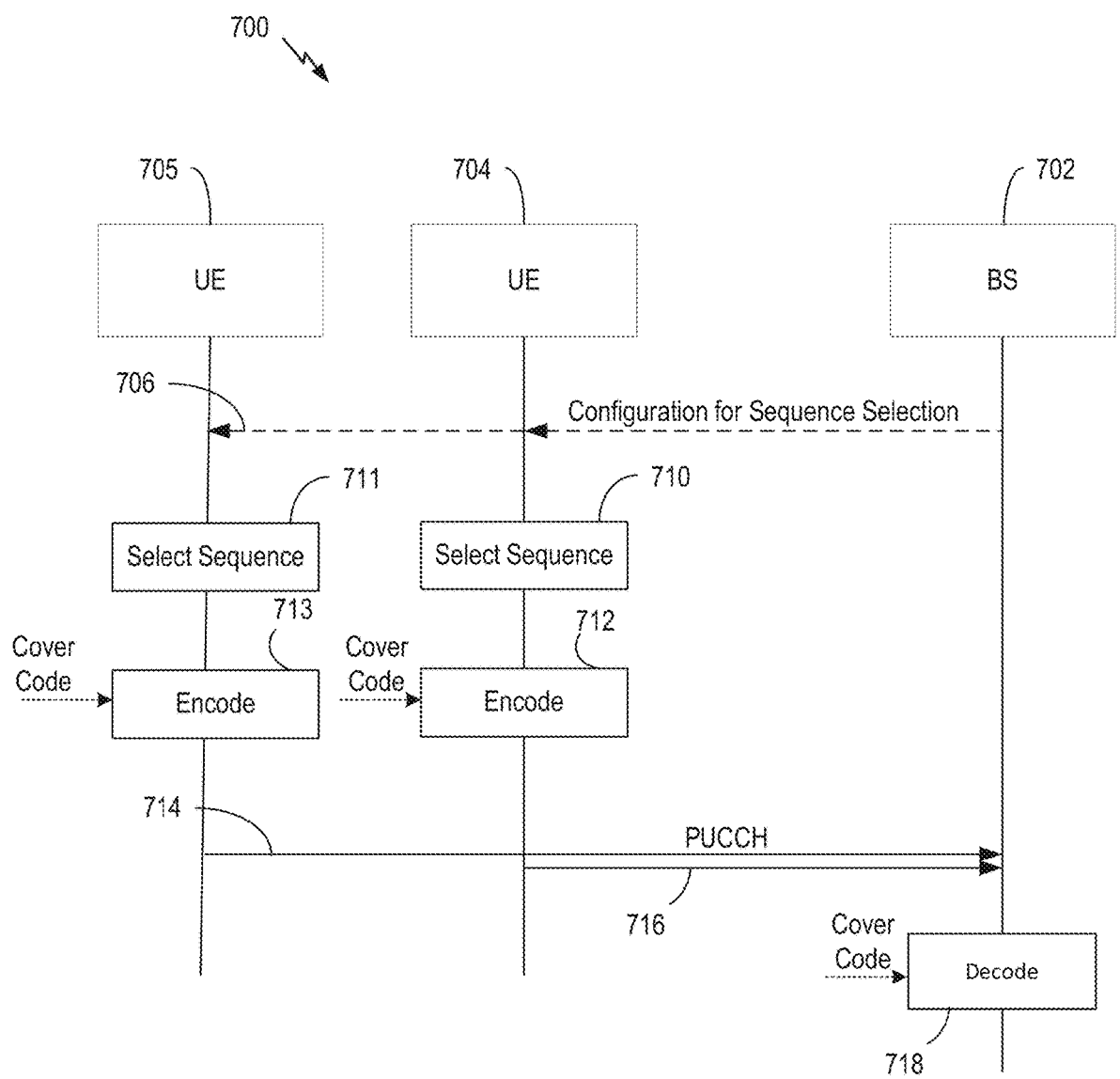
FIG. 7 is a call flow diagram illustrating example operations for physical uplink control channel transmission, in accordance with certain aspects of the present disclosure.

FIG. 7 is a call flow diagram illustrating example operations 700 for PUCCH transmission, in accordance with certain aspects of the present disclosure. As shown, the BS 702 may provide configurations 706 for sequence selection to UEs 704, 705. Each of UEs 704, 705 may select a sequence based on one of the configurations 706 at blocks 710, 711, respectively. The configurations for sequence selection may indicate a level of code-division multiplexing associated with each of candidate sequences that may be selected for PUCCH transmission, and/or candidate lengths of sequences that may be selected for PUCCH transmission. For example, the BS may provide configurations indicating different lengths of sequences, and the UE may select one of the sequences depending on an amount of information the UE has to transmit using the sequence. In some aspects, the configurations 706 may also indicate a type of code-division multiplexing to be used (e.g., type A as described with respect to FIG. 4 or type B as described with respect to FIG. 5).

In some aspects, providing the configurations 706 provides each UE the flexibility to choose among one of the configurations 706 depending on the amount of uplink data to be communicated and channel conditions. The configurations 706 may be in the form of PUCCH resource configurations. Since a UE transmits PUCCH in uplink, the BS allocates time-frequency resources of appropriate size in each configured PUCCH resource. For example, if a PUCCH resource corresponds to a sequence of length NL, then the BS may configure enough symbols in time to transmit the sequence having length NL in uplink. Another PUCCH resource corresponding to a shorter sequence may configure fewer symbols in time. The BS allows each UE to choose which PUCCH resource to select and transmit on, and the BS monitors on all the configured uplink resources for UE transmission. Moreover, the uplink resources may be shared between PUCCH resource configurations because only one configuration may be selected by the UE. Thus, the BS may have to monitor only a few uplink resources (e.g., fewer then the number of configurations).

As described, each UE may select a sequence from a sequence database, based on one of the configurations from the base station. For example, depending on an amount of information to be conveyed, a UE may select a sequence of a longer length. Each sequence may be associated with a resource for transmission. For example, UEs 704, 705 may select the same sequence and transmit the sequence using the same resource. When using CDM type A as described with respect to FIG. 4, the UEs may use orthogonal (or close to orthogonal) cover codes for transmission of sequences. When using CDM type B as described with respect to FIG. 5, the UEs may be configured to use different shifts or roots of the sequence to convey control information.

As described with respect to FIG. 4, a PUCCH may be generated (e.g., encoded at blocks 712 and 713) by each of UEs 704 and 705 using cover codes that may be orthogonal, reducing interference between transmissions of UEs 704 and 705 that occur at the same time. As shown, PUCCHs 714 and 716 are transmitted at the same time using code-division multiplexing. The BS may receive the PUCCHs 714 and 716 and at block 718, decode the PUCCHs using the associated cover codes (e.g., PUCCH 714 is decoded using the cover code used to generate PUCCH 714 and PUCCH 716 is decoded using the cover code used to generate PUCCH 716).

Figure 8:
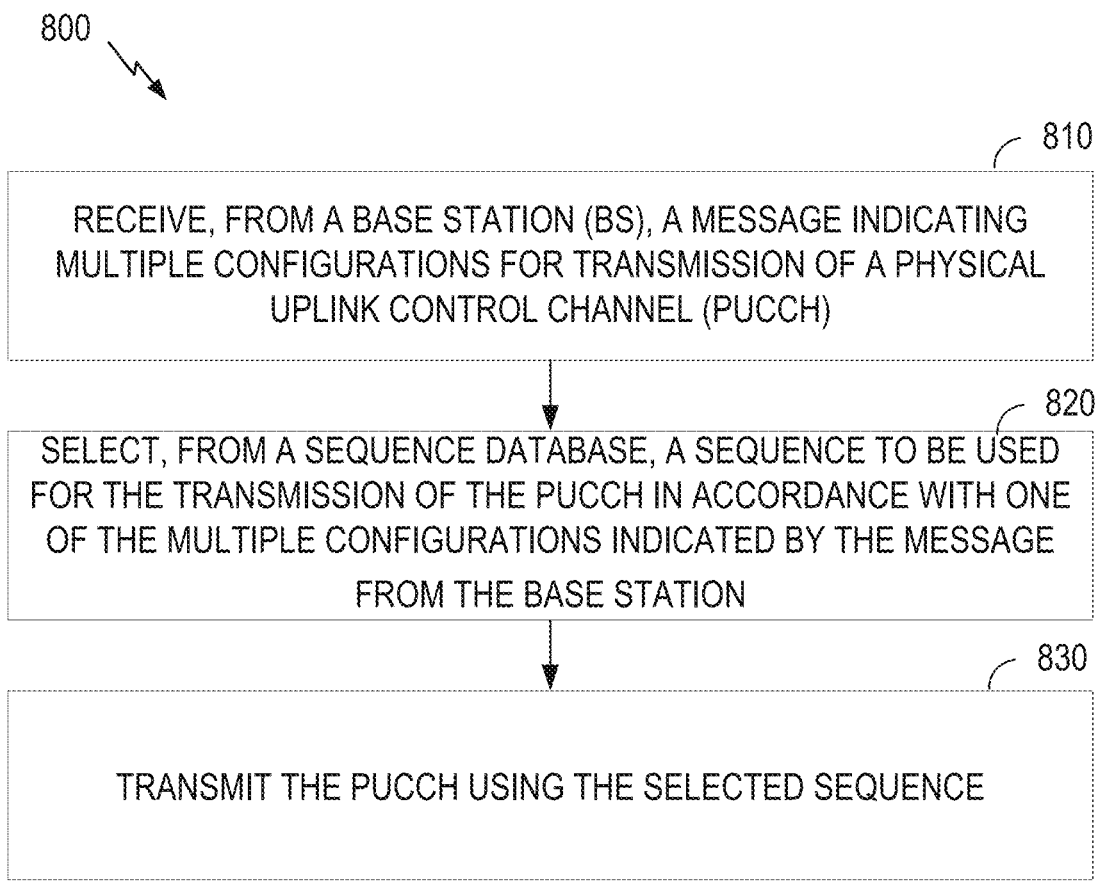
FIG. 8 is a flow diagram illustrating example operations for wireless communication by a user equipment, in accordance with certain aspects of the present disclosure.

FIG. 8 is a flow diagram illustrating example operations 800 for wireless communication, in accordance with certain aspects of the present disclosure. The operations 800 may be performed, for example, by a UE (e.g., a UE 104 in the wireless communication network 100 of FIG. 1).

Operations 800 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280 or control component 281 of FIG. 2) obtaining and/or outputting signals.

The operations 800 begin, at block 810, with the UE receiving, from a base station (BS), a message indicating multiple configurations (e.g., configurations 706 in FIG. 7) for physical uplink control channel (PUCCH) transmission.

At block 820, the UE selects, from a sequence database (e.g., sequence database 402), a sequence to be used for the transmission of the PUCCH in accordance with one of the multiple configurations indicated by the message from the base station. For example, the configurations may indicate sequences of different lengths (e.g., length L), roots, or types. Selecting the sequence may include selecting the sequence having one of the lengths based on an amount of information (e.g., number of bits K as described with respect to FIG. 4) to be conveyed via the PUCCH. For instance, the more information to be conveyed via the PUCCH, the longer the sequence to be selected.

In some aspects, the configurations indicate sequences associated with different roots, as described. Selecting the sequence may include selecting the sequence having one of the roots. The selection of the one of the roots may be used to convey information to the BS based on a configured mapping between the one of the roots and the information to be conveyed. As an example, selection of a particular root may indicate an ACK or a NACK.

At block 830, the UE transmit the PUCCH using the selected sequence. In some aspects, the UE selects a number of repetitions (e.g., N repetitions as described with respect to FIG. 4) to be used for transmission of the PUCCH, wherein transmitting the PUCCH comprises transmitting the repetitions of the sequence based on the selected number of repetitions. Each repetition may be generated using a cover code (e.g., cover codes wo to wN-1). In some aspects, the repetitions are multiplexed in the same time and frequency resource with one or more other PUCCH transmissions from one or more other UEs using cover codes. For example, the cover codes may be orthogonal. In other aspects, the cover code may be non-orthogonal (e.g., close to orthogonal) with one or more cover codes used by one or more other UEs for transmission during the same time and frequency resource used to transmit the repetition.

In some aspects, a subset of cyclic shifts for the sequence may be used for conveying information via the PUCCH (e.g., as described with respect to FIG. 5). In some aspects, the message includes an indication of a number of UEs (e.g., level of CDMing) that are code-division multiplexed. The selection of the sequence may be based on the indication of the number of UEs.

In some aspects, the message includes an indication of a type of code-division multiplexing. For example, the message may indicate whether to perform type A CDM as described with respect to FIG. 4, or perform type B CDM as described with respect to FIG. 5. The selection of the sequence may be based on the indication of the type of code-division multiplexing. In some aspects, the sequence is associated with at least one a UE identifier (ID) of the UE or a cell ID of a cell used to transmit the PUCCH.

In some aspects, the UE performs multiple selections of sequences for PUCCH transmission on a periodic basis, wherein the selection of the sequence is one of multiple selections of sequences. In some aspects, the message includes an indication of a fixed number of cyclic shifts or roots to be used for conveying information via the sequence. In other words, a fixed number of cyclic shifts or roots may be assigned to the UE for conveying information, where other cyclic shifts or roots may be assigned to other UEs to convey information.

Figure 9:
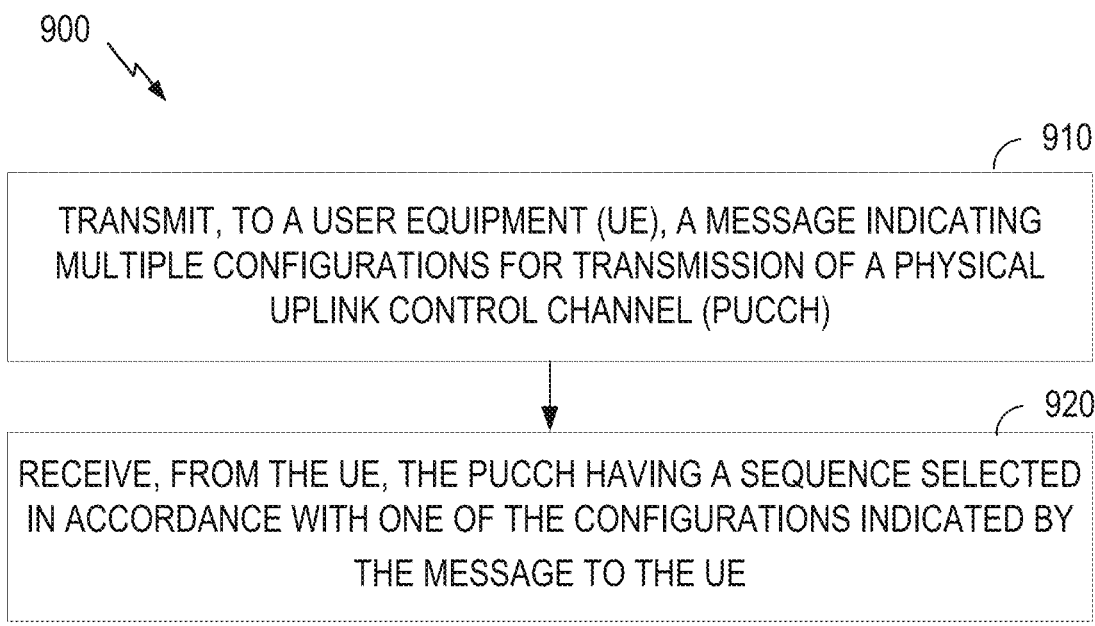
FIG. 9 is a flow diagram illustrating example operations for wireless communication by a base station, in accordance with certain aspects of the present disclosure.

FIG. 9 is a flow diagram illustrating example operations 900 for wireless communication, in accordance with certain aspects of the present disclosure. The operations 900 may be performed, for example, by a BS (e.g., such as the BS 102 in the wireless communication network 100 of FIG. 1).

Operations 900 may be implemented as software components that are executed and run on one or more processors (e.g., controller/processor 240 of FIG. 2). Further, the transmission and reception of signals by the BS in operations 900 may be enabled, for example, by one or more antennas (e.g., antennas 234 of FIG. 2). In certain aspects, the transmission and/or reception of signals by the BS may be implemented via a bus interface of one or more processors (e.g., controller/processor 240 or control component 241 of FIG. 2) obtaining and/or outputting signals.

The operations 900 begin, at block 910, with the BS transmitting, to a user equipment (UE), a message indicating multiple configurations for transmission of a physical uplink control channel (PUCCH).

At block 920, the BS receives, from the UE, the PUCCH having a sequence selected in accordance with one of the configurations indicated by the message to the UE. In some aspects, the configurations indicate sequences of different lengths. In some aspects, the BS determines information conveyed by the PUCCH based on a configured mapping between a root of the sequence and the information to be conveyed.

In certain aspects, the message includes an indication of a number of UEs that are to be code-division multiplexed when transmitting using the sequence. In some aspects, the message includes an indication of a type of code-division multiplexing to be used for transmission using the sequence. In some cases, the sequence is associated with at least one a UE identifier (ID) of the UE or a cell ID of a cell used to transmit the PUCCH. In some aspects, the message includes an indication of a fixed number of cyclic shifts or roots to be used for conveying information via the sequence.

In some aspects, the BS selects a number of repetitions to be used for transmission of the PUCCH, wherein receiving the PUCCH comprises receiving the repetitions of the sequence based on the selected number of repetitions. For example, each repetition may be decoded using a cover code. In some aspects, the BS may receive PUCCH repetitions from different UEs (e.g., UEs 704, 705), the PUCCH repetitions including the repetitions of the PUCCH from the UE. The PUCCH repetitions from the different UEs may be multiplexed in the same time and frequency resource using cover codes. The cover code may be orthogonal (or non-orthogonal), as described herein. In some aspects, a subset of cyclic shifts for the sequence are used for conveying information via the PUCCH. For example, the BS may receive a PUCCH from another UE (e.g., UE 705). The UE (e.g., UE 704) and the other UE may use mutually exclusive cyclic shifts or roots of the sequence for conveying information via the PUCCH (e.g., PUCCH 714) and the other PUCCH (e.g., PUCCH 716), respectively.

Example Wireless Communication Devices

Figure 10:
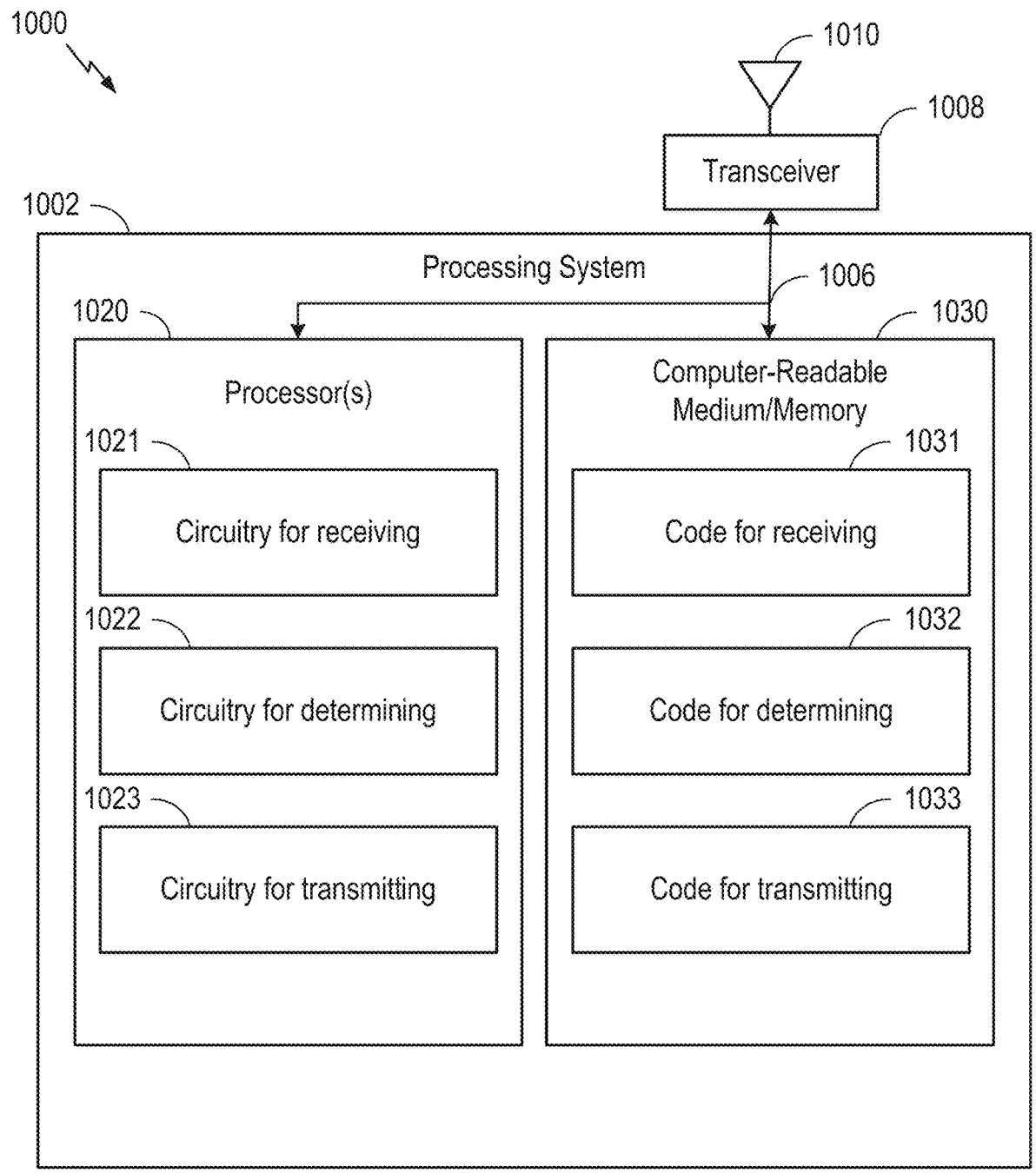
FIG. 10 depicts aspects of an example communications device.

FIG. 10 depicts an example communications device 1000 that includes various components operable, configured, or adapted to perform operations for the techniques disclosed herein, such as the operations depicted and described with respect to FIGS. 7 and 9. In some examples, communication device 1000 may be a base station 102 as described, for example with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations illustrated in FIGS. 7 and 9, or other operations for performing the various techniques discussed herein for receive a control channel using code-division multiplexing.

In the depicted example, computer-readable medium/memory 1030 stores code 1031 for receiving, code 1032 for determining, and code 1033 for transmitting.

In the depicted example, the one or more processors 1020 include circuitry configured to implement the code stored in the computer-readable medium/memory 1030, including circuitry 1021 for receiving, circuitry 1022 for determining, and circuitry 1023 for transmitting.

Various components of communications device 1000 may provide means for performing the methods described herein, including with respect to FIGS. 7 and 9.

In some examples, means for transmitting or sending (or means for outputting for transmission) may include the transceivers 232 and/or antenna(s) 234 of the base station 102 illustrated in FIG. 2 and/or transceiver 1008 and antenna 1010 of the communication device 1000 in FIG. 10.

In some examples, means for receiving (or means for obtaining) may include the transceivers 232 and/or antenna(s) 234 of the base station illustrated in FIG. 2 and/or transceiver 1008 and antenna 1010 of the communication device 1000 in FIG. 10.

In some examples, means for receiving, means for determining, and means for transmitting may include various processing system components, such as: the one or more processors 1020 in FIG. 10, or aspects of the base station 102 depicted in FIG. 2, including receive processor 238, transmit processor 220, TX MIMO processor 230, and/or controller/processor 240 (including a control component 241).

Notably, FIG. 10 is just one example, and many other examples and configurations of communication device 1000 are possible.

Figure 11:
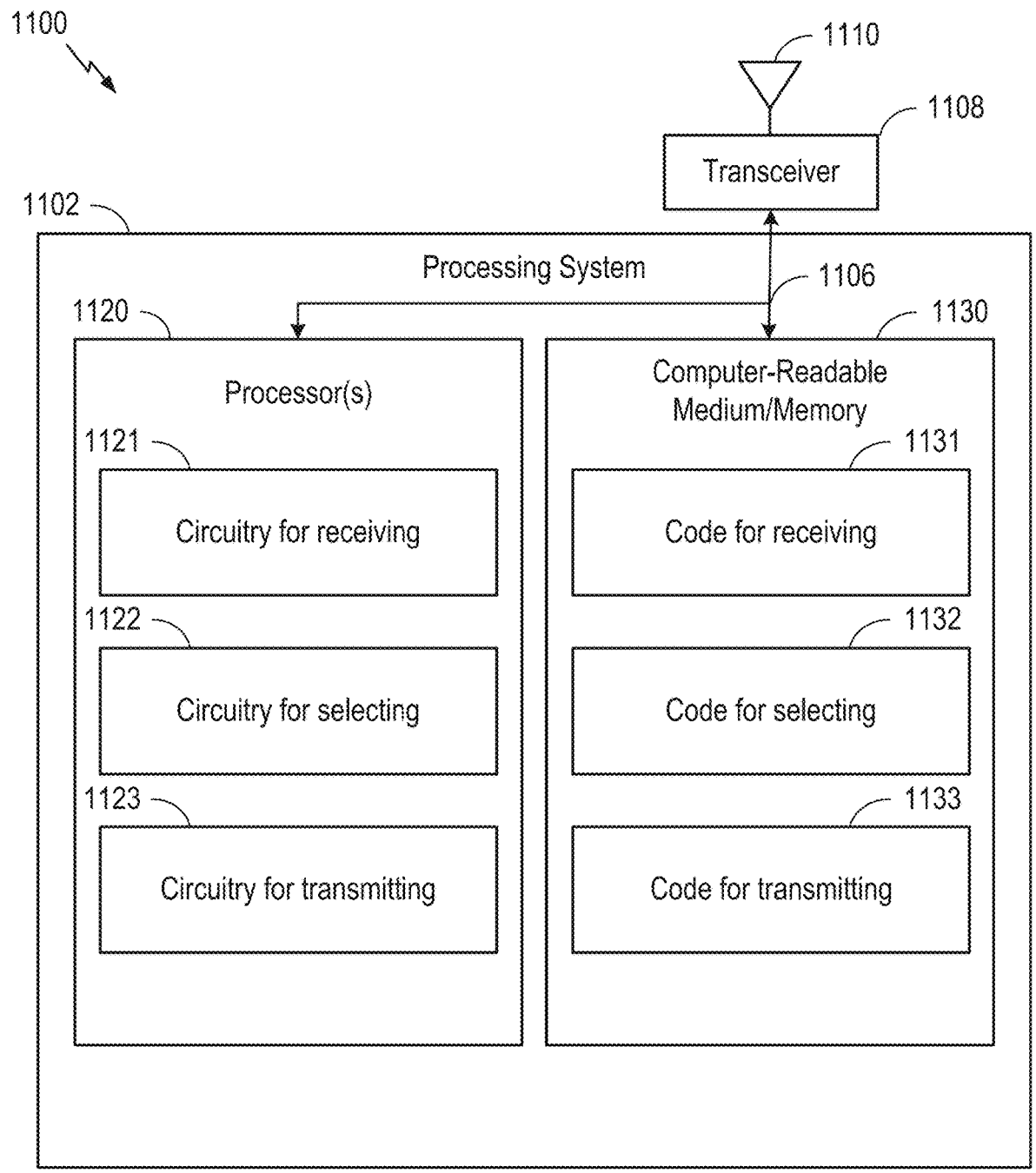
FIG. 11 depicts aspects of another example communications device.

FIG. 11 depicts an example communications device 1100 that includes various components operable, configured, or adapted to perform operations for the techniques disclosed herein, such as the operations depicted and described with respect to FIGS. 7 and 8. In some examples, communication device 1100 may be a user equipment 104 as described, for example with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIGS. 7 and 8, or other operations for performing the various techniques discussed herein for generate a control channel using a code-division multiplexing.

In the depicted example, computer-readable medium/memory 1130 stores code 1131 for receiving, code 1132 for selecting, and code 1133 for transmitting.

In the depicted example, the one or more processors 1120 include circuitry configured to implement the code stored in the computer-readable medium/memory 1130, including circuitry 1121 for receiving, circuitry 1122 for selecting, and circuitry 1123 for transmitting.

Various components of communications device 1100 may provide means for performing the methods described herein, including with respect to FIGS. 7 and 8.

In some examples, means for transmitting or sending (or means for outputting for transmission) may include the transceivers 254 and/or antenna(s) 252 of the user equipment 104 illustrated in FIG. 2 and/or transceiver 1108 and antenna 1110 of the communication device 1100 in FIG. 11.

In some examples, means for receiving (or means for obtaining) may include the transceivers 254 and/or antenna(s) 252 of the user equipment 104 illustrated in FIG. 2 and/or transceiver 1108 and antenna 1110 of the communication device 1100 in FIG. 11.

In some examples, means for receiving, means for selecting, and means for transmitting may include various processing system components, such as: the one or more processors 1120 in FIG. 11, or aspects of the user equipment 104 depicted in FIG. 2, including receive processor 258, transmit processor 264, TX MIMO processor 266, and/or controller/processor 280 (including a control component 281).

Notably, FIG. 11 is just one example, and many other examples and configurations of communication device 1100 are possible.

Example Clauses

Implementation examples are described in the following numbered clauses:

Clause 1. A method for wireless communication by a user equipment (UE), comprising: receiving, from a base station (BS), a message indicating multiple configurations for physical uplink control channel (PUCCH) transmission; selecting, from a sequence database, a sequence to be used for the transmission of a PUCCH in accordance with one of the multiple configurations indicated by the message from the base station; and transmitting the PUCCH using the selected sequence.

Clause 2. The method of clause 1, wherein: the multiple configurations indicate sequences of different lengths, and selecting the sequence comprises selecting the sequence based on an amount of information to be conveyed via the PUCCH.

Clause 3. The method of any one of clauses 1-2, wherein: the configurations indicate sequences associated with different roots, and selecting the sequence includes selecting the sequence having one of the roots, the selection of the one of the roots being used to convey information to the BS based on a configured mapping between the one of the roots and the information to be conveyed.

Clause 4. The method of any one of clauses 1-3, further comprising: selecting a number of repetitions to be used for transmission of the PUCCH, wherein transmitting the PUCCH comprises transmitting the repetitions of the sequence based on the selected number of repetitions.

Clause 5. The method of clause 4, wherein the repetitions are multiplexed in the same time and frequency resource with one or more other PUCCH transmissions from one or more other UEs using cover codes.

Clause 6. The method of clause 5, wherein the cover codes are orthogonal.

Clause 7. The method of any one of clauses 1-6, wherein a subset of cyclic shifts for the sequence are used for conveying information via the PUCCH.

Clause 8. The method of any one of clauses 1-7, wherein: the message includes an indication of a number of UEs that are code division multiplexed, and the selection of the sequence is based on the indication of the number of UEs.

Clause 9. The method of any one of clauses 1-8, wherein: the message includes an indication of a type of code division multiplexing, and the selection of the sequence is based on the indication of the type of code division multiplexing.

Clause 10. The method of any one of clauses 1-9, wherein the sequence is associated with at least one of a UE identifier (ID) of the UE or a cell ID of a cell used to transmit the PUCCH.

Clause 11. The method of any one of clauses 1-10, further comprising changing a sequence used for PUCCH transmission on a periodic basis.

Clause 12. The method of any one of clauses 1-11, wherein the message includes an indication of a fixed number of cyclic shifts or roots to be used for conveying information via the sequence.

Clause 13. The method of any one of clauses 1-12, wherein the sequence database comprises sequences of at least one of different lengths, roots, or types of sequences.

Clause 14. A method for wireless communication by a base station (BS), comprising: transmitting, to a user equipment (UE), a message indicating multiple configurations for physical uplink control channel (PUCCH) transmission; and receiving, from the UE, a PUCCH having a sequence selected in accordance with one of the configurations indicated by the message to the UE.

Clause 15. The method of clause 14, wherein the configurations indicate sequences of at least one of different lengths, roots, or types of sequences.

Clause 16. The method of any one of clauses 14-15, further comprising determining information conveyed by the PUCCH based on a configured mapping between a root of the sequence and the information to be conveyed.

Clause 17. The method of any one of clauses 14-16, further comprising selecting a number of repetitions to be used for transmission of the PUCCH, wherein receiving the PUCCH comprises receiving the repetitions of the sequence based on the selected number of repetitions.

Clause 18. The method of clause 17, further comprising receiving PUCCH repetitions from different UEs, the PUCCH repetitions including the repetitions of the PUCCH from the UE, wherein the PUCCH repetitions from the different UEs are multiplexed in the same time and frequency resource using cover codes.

Clause 19. The method of clause 18, wherein the cover codes are orthogonal.

Clause 20. The method of any one of clauses 14-19, wherein a subset of cyclic shifts for the sequence are used for conveying information via the PUCCH.

Clause 21. The method of any one of clauses 14-20, further comprising receiving a PUCCH from another UE, wherein the UE and the other UE use mutually exclusive cyclic shifts or roots of the sequence for conveying information via the PUCCH and the other PUCCH, respectively.

Clause 22. The method of any one of clauses 14-21, wherein the message includes an indication of a number of UEs that are code division multiplexed when transmitting using the sequence.

Clause 23. The method of clause 22, wherein the message further includes an indication of a cover code to be used for transmission of the PUCCH, the indicated cover code being associated with the number of UEs that are code division multiplexed.

Clause 24. The method of any one of clauses 14-23, wherein the message includes an indication of a type of code division multiplexing to be used for transmission using the sequence.

Clause 25. The method of any one of clauses 14-24, wherein the sequence is associated with at least one a UE identifier (ID) of the UE or a cell ID of a cell used to transmit the PUCCH.

Clause 26. The method of any one of clauses 14-25, wherein the message includes an indication of a fixed number of cyclic shifts or roots to be used for conveying information via the sequence.

Clause 27. The method of any one of clauses 14-26, further comprising receiving, from at least two other UEs, at least one two other PUCCHs that are time-division multiplexed, wherein the at least two other PUCCHs are code-division multiplexed with the PUCCH received from the UE.

Clause 28. The method of any one of clauses 14-27, wherein the message allocates uplink resources for each of multiple sequences that are candidates to be selected for transmission of the PUCCH.

Clause 29: An apparatus, comprising: a memory comprising executable instructions; one or more processors configured to execute the executable instructions and cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by one or more processors of an apparatus, cause the apparatus to perform a method in accordance with any one of Clauses 1-28.

Clause 32: A computer program product embodied on a computer-readable storage medium comprising code for performing a method in accordance with any one of Clauses 1-28.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used.

In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as R$x$ for one particular configuration, where 100$x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of control signal transmission in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code-division multiple access (CDMA), time division multiple access (TDMA), frequency division multiple access (FDMA), orthogonal frequency division multiple access (OFDMA), single-carrier frequency division multiple access (SC-FDMA), time division synchronous code-division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication by a user equipment (UE), comprising:
   a memory; and
   one or more processors coupled to the memory, the one or more processors being configured to:
      receive, from a base station (BS), a message indicating multiple configurations for physical uplink control channel (PUCCH) transmission;
      select, from a sequence database, a sequence to be used for the PUCCH transmission in accordance with one of the multiple configurations indicated by the message from the base station; and
      transmit the PUCCH using the selected sequence, wherein the sequence is restricted to a time-domain.

2. The apparatus of claim 1, wherein:
   the multiple configurations indicate sequences of different lengths, and
   to select the sequence, the one or more processors are configured to select the sequence based on an amount of information to be conveyed via the PUCCH.

3. The apparatus of claim 1, wherein:
   the configurations indicate sequences associated with different roots, and
   to select the sequence, the one or more processors are configured to select the sequence having one of the roots, the selection of the one of the roots being used to convey information to the BS based on a configured mapping between the one of the roots and the information to be conveyed.

4. The apparatus of claim 1, wherein the one or more processors are further configured to:
   select a number of repetitions to be used for transmission of the PUCCH,
   wherein, to transmit the PUCCH, the one or more processors are further configured to transmit the repetitions of the sequence based on the selected number of repetitions.

5. The apparatus of claim 4, wherein the repetitions are multiplexed in the same time and frequency resource with one or more other PUCCH transmissions from one or more other UEs using cover codes.

6. The apparatus of claim 5, wherein the cover codes are orthogonal.

7. The apparatus of claim 1, wherein a subset of cyclic shifts for the sequence are used for conveying information via the PUCCH.

8. The apparatus of claim 1, wherein:
the message includes an indication of a number of UEs that are code division multiplexed, and
the one or more processors are configured to select the sequence based on the indication of the number of UEs.

9. The apparatus of claim 1, wherein:
the message includes an indication of a type of code division multiplexing, and
the one or more processors are configured to select the sequence based on the indication of the type of code division multiplexing.

10. The apparatus of claim 1, wherein the sequence is associated with at least one of a UE identifier (ID) of the UE or a cell ID of a cell used to transmit the PUCCH.

11. The apparatus of claim 1, the one or more processors are further configured to change a sequence used for PUCCH transmission on a periodic basis.

12. The apparatus of claim 1, wherein the message includes an indication of a fixed number of cyclic shifts or roots to be used for conveying information via the sequence.

13. The apparatus of claim 1, wherein the sequence database comprises sequences of at least one of different lengths, different roots, or different types of sequences.

14. An apparatus for wireless communication by a base station (BS), comprising:
a memory;
one or more processors coupled to the memory, the one or more processors being further configured to:
transmit, to a user equipment (UE), a message indicating multiple configurations for physical uplink control channel (PUCCH) transmission; and
receive, from the UE, a PUCCH having a sequence selected in accordance with one of the configurations indicated by the message to the UE, wherein the sequence is restricted to a time-domain.

15. The apparatus of claim 14, wherein the configurations indicate sequences of at least one of different lengths, different roots, or different types of sequences.

16. The apparatus of claim 14, wherein the one or more processors are further configured to determine information conveyed by the PUCCH based on a configured mapping between a root of the sequence and the information to be conveyed.

17. The apparatus of claim 14, wherein the one or more processors are further configured to select a number of repetitions to be used for transmission of the PUCCH, and wherein to receive the PUCCH, the one or more processors are further configured to receive repetitions of the sequence based on the selected number of repetitions.

18. The apparatus of claim 17, wherein the one or more processors are further configured to receive PUCCH repetitions from different UEs, the PUCCH repetitions including repetitions of the PUCCH from the UE, wherein the PUCCH repetitions from the different UEs are multiplexed in the same time and frequency resource using cover codes.

19. The apparatus of claim 18, wherein the cover codes are orthogonal.

20. The apparatus of claim 14, wherein a subset of cyclic shifts for the sequence are used for conveying information via the PUCCH.

21. The apparatus of claim 14, wherein the one or more processors are further configured to receive a PUCCH from another UE, wherein the UE and the other UE use mutually exclusive cyclic shifts or roots of the sequence for conveying information via the PUCCH and the other PUCCH, respectively.

22. The apparatus of claim 14, wherein the message includes an indication of a number of UEs that are code division multiplexed when transmitting using the sequence.

23. The apparatus of claim 22, wherein the message further includes an indication of a cover code to be used for transmission of the PUCCH, the indicated cover code being associated with the number of UEs that are code division multiplexed.

24. The apparatus of claim 14, wherein the message includes an indication of a type of code division multiplexing to be used for transmission using the sequence.

25. The apparatus of claim 14, wherein the sequence is associated with at least one of a UE identifier (ID) of the UE or a cell ID of a cell used to transmit the PUCCH.

26. The apparatus of claim 14, wherein the message includes an indication of a fixed number of cyclic shifts or roots to be used for conveying information via the sequence.

27. The apparatus of claim 14, wherein the one or more processors are further configured to receive, from at least two other UEs, at least two other PUCCHs that are time-division multiplexed, wherein the at least two other PUCCHs are code-division multiplexed with the PUCCH received from the UE.

28. A method for wireless communication by a user equipment (UE), comprising:
receiving, from a base station (BS), a message indicating multiple configurations for physical uplink control channel (PUCCH) transmission;
selecting from a sequence database, a sequence to be used for the PUCCH transmission in accordance with one of the multiple configurations indicated by the message from the base station; and
transmitting the PUCCH using the selected sequence, wherein the sequence is restricted to a time-domain.

29. A method for wireless communication by a base station (BS), comprising:
transmitting, to a user equipment (UE), a message indicating multiple configurations for physical uplink control channel (PUCCH) transmission; and
receiving, from the UE, a PUCCH having a sequence selected in accordance with one of the configurations indicated by the message to the UE, wherein the sequence is restricted to a time-domain.

* * * * *